June 10, 1947. E. L. TORNQUIST 2,422,147
ELECTRIC MOTOR SPEED CONTROL SYSTEM AND METHOD
Filed Oct. 30, 1942 2 Sheets-Sheet 1
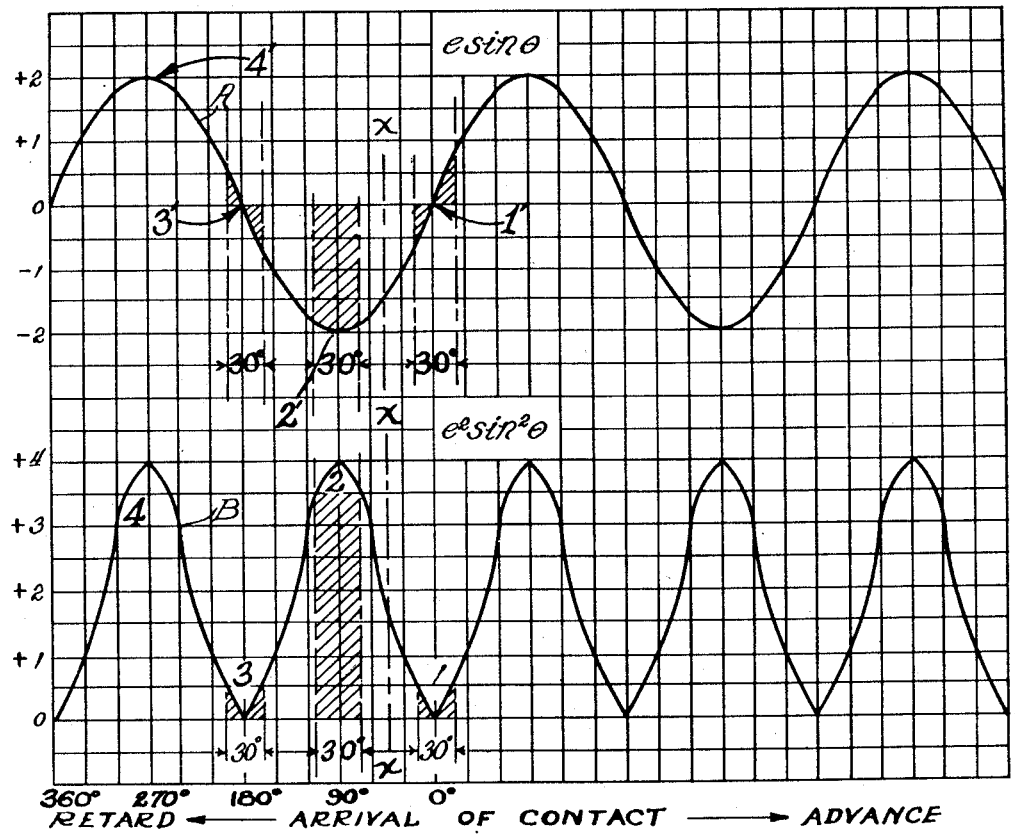
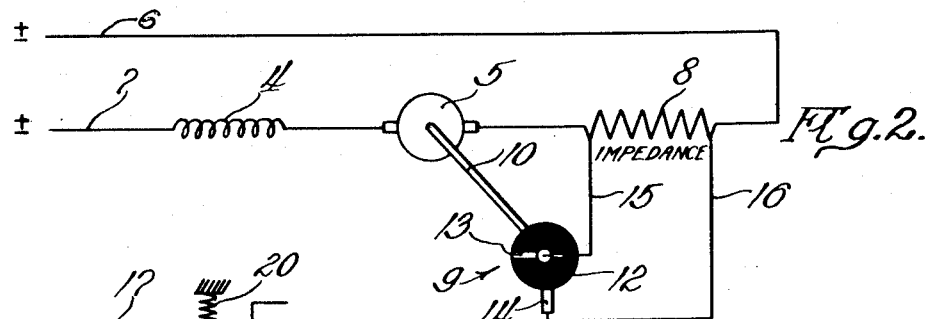
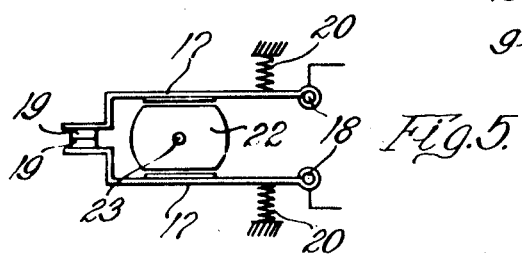
INVENTOR.
Earl L. Tornquist June 10, 1947.  E. L. TORNQUIST  2,422,147
ELECTRIC MOTOR SPEED CONTROL SYSTEM AND METHOD
Filed Oct. 30, 1942  2 Sheets-Sheet 2
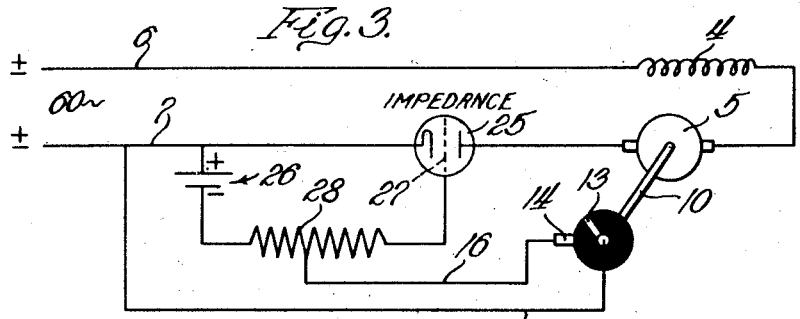
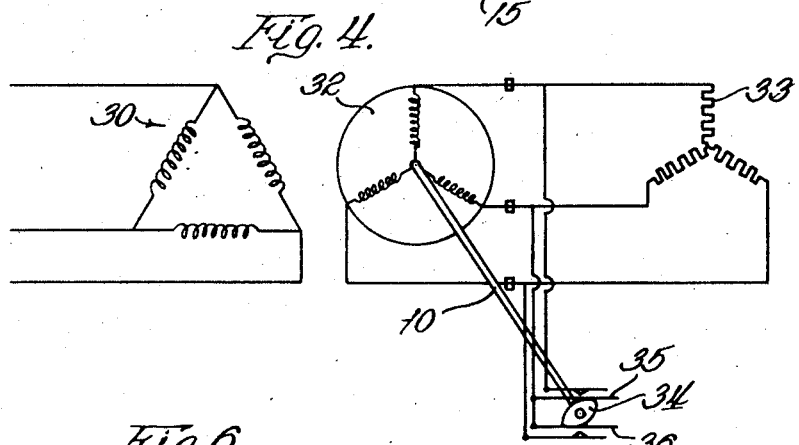
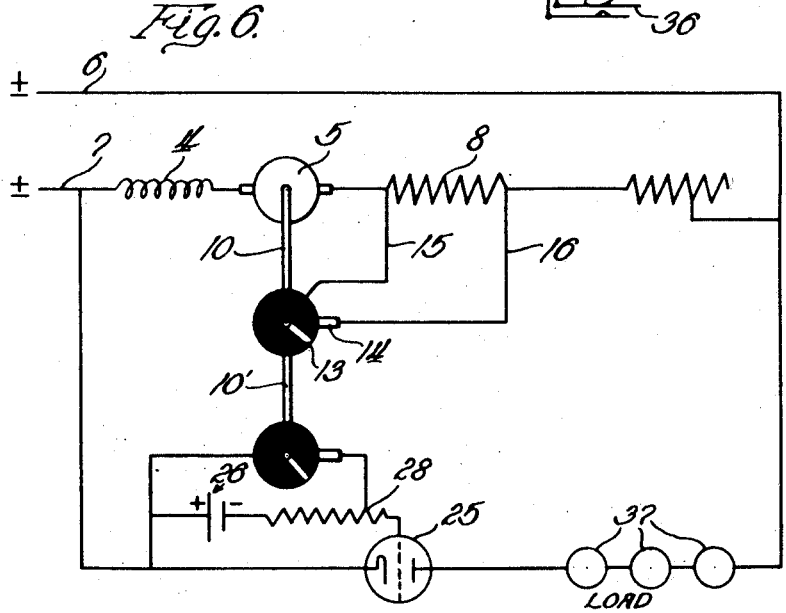
INVENTOR.
Earl L. Tornquist Patented June 10, 1947

2,422,147

UNITED STATES PATENT OFFICE 2,422,147

ELECTRIC MOTOR SPEED CONTROL SYSTEM AND METHOD

Earl L. Tornquist, Elmhurst, Ill., assignor of one-half to John A. Dienner, Evanston, Ill.

Application October 30, 1942, Serial No. 463,916

17 Claims. (Cl. 172—293)

My invention relates to electric motors and more particularly it teaches a method and means for producing synchronous operation of an alternating current motor which is inherently asynchronous.

Synchronous motors are well known and their characteristics have been thoroughly investigated and published. The concept of a synchronous motor involves the arrival of a moving magnetic element into the field of a cooperating stationary magnetic element in time with the alternation of the alternating voltage wave which produces a field in one or both of said elements. A practical necessity is the need for a means which will accelerate the moving element to a speed at which the moving element will lock in with the voltage wave. This is frequently provided by a separate or built in series motor element or induction motor element of higher speed which may or may not be disabled when the main motor element reaches synchronism. See Wood Patent No. 1,102,116, June 30, 1914.

Holtz Patent No. 1,892,552, of December 27, 1932, discloses a motor having an induction motor element of asynchronous characteristics combined with magnetic material disposed in a polar or magnetically asymmetrical form suitable to produce variations in reactance of the rotor tending to cause it to operate synchronously with the alternations of the wave of voltage.

According to my invention, the structure of the motor parts is not altered, i. e., the motor parts are not subdivided for differences in function, nor are they rendered polar by magnetically asymmetrical disposition of the magnetic material. The novel concept of my invention is to alter the impressed instantaneous voltage within a definite part of the wave in accordance with the position of the moving element relative to the stationary element. Thereby the moving element is tied or locked to a definite part of the alternating current wave and maintains synchronism.

An embodiment of simple character involves the provision of a motor of the non-synchronous type, such as a series motor suitable for alternating current operation connected to a source of alternating current in series with an impedance of any desired value. An example of a suitable motor is a series motor which will operate on alternating current or on direct current. The impedance may be a resistance or inductance or other device for reducing the impressed voltage to any desired degree. The armature shaft of the motor operates a switch which closes in synchronism with the rotation of the shaft and at a predetermined angular position to short circuit the impedance and thereby impress during a predetermined part or parts of the angular motion of each rotation of the movable element, a potential which is selected from the part of the voltage wave corresponding to the instantaneous angular position of the movable element. The effect is to supply impulses of instantaneous voltage from the voltage wave suitable to keep the motor locked in step with the wave. The instantaneous voltage may be selected from each 180°, or a suitable fraction or multiple thereof, depending upon what synchronous speed is selected as the design speed of the motor.

I am aware that it has been attempted to maintain constant the speed of an alternating current series type motor by employing a centrifugal governor to switch series resistance in or out of the motor circuit. See Merrill Patent No. 2,112,741. This, however, in no wise bears upon my invention, since it does not lock the angular position of the motor element to the angular position of the current wave. Neither is there in Merrill any concept of graduation of impressed instantaneous voltage to meet increased load which is inherent in my method. Also there is a wastage of power in sending most of the power current through the resistance.

The application of my invention to various designs of motor will be apparent to those skilled in the art. The invention is particularly applicable to alternating current motors of the asynchronous type one form of which is the series motor. By way of example, but not of limitation, the invention may be embodied in the straight series motor, the repulsion motor, the wound rotor slip ring motor and others.

The impedance employed may be infinite, i. e., a gap in an electron tube which is periodically fired to increase or establish or apply the impressed voltage. The point is that a resistance and synchronous switch, or the tube and its gap with synchronous break down are only specific ways of securing the desired selection of instantaneous impressed voltage within the cycle or wave.

Also, while the present preferred method of practicing the invention is not to alter the structure of the motor parts, that is obviously not intended to be a limiting factor, for there are situations in which the principle of my method of attaining and holding synchronism may be combined with other methods or means.

It is to be noted that external variations of impressed voltage do not interfere with the theory or application of my invention, since the selection of impressed instantaneous voltage is the determining factor so long as the total power available from which to select is high enough to pull the load. If the impressed voltage is low, the motor shifts its instantaneous angular position relative to the voltage wave to select either a higher point on the wave or in the case where a tube is fired to include more of the wave.

Hence, I find that my motor will correspond in performance under variations of torque and impressed voltage to those of a typical synchronous motor. For certain purposes it is a better performer than a synchronous motor for example starting under load.

Now in order to acquaint those skilled in the art with the manner of constructing and operating a device embodying my invention, I shall described, in conjunction with the accompanying drawings, a specific embodiment of the same.

In the drawings:

Figure 1 is a chart of voltage and power waves for explaining the relation between angular position of the contactor and the power selectable to drive the rotor;

Figure 2 is a diagram of a simple form of electric motor embodying my invention, and employing a resistance and a synchronous shunting switch as the controlled impedance;

Figure 3 is a similar diagram of a motor employing a tube, such as a thyratron and a synchronous firing switch for the controlled impedance;

Figure 4 is a diagram of a three-phase motor having a wound rotor and resistance controlled in accordance with my invention;

Figure 5 is a detail of the cam and contacts; and

Figure 6 is a diagram of a regulating system employing the motor of my invention as a means for regulating the power applied to a load, independently of voltage.

On the chart of Figure 1, curve A shows a conventional sine wave curve of alternating voltage. Curve B shows the power component corresponding to the wave of voltage A assuming the power to be a function of the square of the voltage. It will be observed that the amount of power available in the thirty electrical degrees shown on curve B at 1 corresponding to the voltage at 1' on curve A is relatively small, whereas in the 30 electrical degrees at 2 on curve B corresponding to the voltage at 2' on curve A the power is relatively large. I utilize this difference in available instantaneous voltage at different portions of the sine wave to control the speed of a motor.

Referring now to Figure 2, I have shown, in conventional representation, a series type of motor suitable for operation on alternating current and including the stator having a field 4 and a rotor comprising an armature 5 connected to the power supply wires 6, 7, leading to a source of alternating voltage. In series with the field 4 and armature 5 I provide an impedance 8 which, in the particular instance, is chiefly resistance. A circuit controller for the impedance 8 is shown at 9, this consisting of a rotatable disk of insulation 12 with a conducting segment 13 mounted on extension 10 of the armature shaft of the motor. A contacting brush 14 is arranged to make contact with the conducting segment 13 of the rotary contactor for a predetermined number of electrical degrees, for example, 30 in this instance. The metallic segment 13 is connected to one terminal of the impedance 8 as by a wire 15 and the brush 14 is connected to the other terminal, or to another portion of the impedance 8, as by the wire 16. When the brush engages the metallic segment 13, the impedance 8 is shorted out. In the illustration given, this shorting occurs through 30 electrical degrees. Thereby the voltage impressed across the terminals of the motor proper is increased by the drop which normally occurs across the impedance 8. The diagram of Figure 1 curve B ignores the normal current flowing through the impedance 8, since this is made only sufficient to turn the motor over, or it may be enough to speed it up to approximately the speed desired for its synchronous speed. It may in fact be small enough to cause the motor on no load to speed up to or above synchronous speed, and the relation of the resistance and the contactor will cause it to lock in at the desired speed.

It will be noted that when the resistance is shorted out through the influence of the rotating contactor, additional torque or boost is given to the rotor. Assuming that this contactor shorts the resistance out for some definite period, for instance 30 electrical degrees, it can be seen that the amount of boost given the rotor will depend upon which part of the sine wave of voltage that the contactor is closed. If, for example, it be closed at 1', curve A practically no boost will be given, but if it should be closed at 2', curve A the maximum amount of boost would be given.

It is assumed that this contactor in the diagram of Figure 2 will close once per revolution. In that case, the motor running 7200 revolutions per minute will short out the resistance somewhere between 1' and 2' in each one-half cycle of the voltage wave. By a proper proportioning of the impedance 8 to the load of the motor, the motor with a given load and constant impressed voltage and running exactly at 7200 R. P. M. would assume a position, so that it would always close its contact somewhere between 1 and 2 on curve B, and the available boost will keep the motor in exact synchronous speed.

If now the load were decreased, the boost given by the instantaneous short circuiting of the resistance 8 would be sufficient to advance the time of closing of the contacts 13, 14, a few electrical degrees, that is, towards the right on curve A, and hence less boost would be given to the motor at each impulse. This advancing of the time of closing the contacts 13, 14 will continue until the torque of the motor again equals the load, or until the load changed, so that the contactor 13, 14 started to close at some point to the right of 1' on curve A, in which case the motor is out of step. Likewise, if the load on the motor increases, the closing of the contactor 13, 14 will be retarded, and thus give more boost to the motor. This retarding of the time of closing the contacts continues until the torque imparted to the motor by the instantaneous impulses equals the load. If the load is so great as to cause the contact to close to the left of the region 2' on curve A, the motor will be out of step and drop down in speed, and it will stall.

In practice so high a speed as 7200 R. P. M. is not desirable. In the motors to which I have applied my invention I have employed either two contacts per revolution which produces 3600 R. P. M. or four contacts per revolution which produces 1800 R. P. M. For example, using a small commercial 110 volt two pole series sewing machine motor (universal type) with a field winding in series with the armature, the armature having a continuous winding disposed in slots on a cylindrical laminated armature with the windings connected to the commutator bars and a fixed resistance of 500 ohms connected in series and shorted out by a circuit closer four times per rotation of the armature shaft a synchronous speed of 1800 R. P. M. is maintained. The value of the resistance 8 is not at all critical. I have successfully used 2000 ohms. In this construction each time that the resistance is shorted out on the quarter revolution, the applied voltage is for approximately 30 electrical degrees on Chart A of Figure 1, closed twice in each cycle, i. e., once in the region between 1' and 2' (curve A) and one in the region between 3' and 4' (curve A). Thus a contact and consequent boost occurring on the rising side of each half cycle the motor will drop into synchronism at the speed at which it gets the required boost on each rotation, and that is, in this case, 1800 R. P. M. Since the armature is uniform in reaction to the poles all around its periphery, and since there are regions of two rising voltage per cycle the synchronous speed S of the motor will be in accordance with the formula—

$$S = \frac{2f60}{C}$$

where S is revolutions per minute, f is frequency in cycles per second and C is the number of closures or contacts shorting the resistance 8 per revolution of the armature 5.

This arrangement provides a method of exact speed control within the limits of load or voltage change as represented by the difference in torque between 30 electrical degrees at 1', and at 2'. The value of the impedance 8 may be any value desired with reference to the load, and the number of electrical degrees in which the contactor, such as 13, 14, remains closed may be some value other than 30 degrees employed above by way of explanation. Experience has demonstrated that an alternating current series motor equipped with the resistance and contactor described in connection with Figure 2, and operating with a constant load, will maintain its designed speed with a voltage impressed on the motor of from 50% to 100% of normal.

The designed speed of such a motor is determined by the number of contacts per revolution, and is equal to 7200 divided by the number of contacts per revolution. This is entirely independent of the number of pairs of poles which the motor comprises, since the number of pairs of poles is not the controlling factor. The contactor does not need to be on the motor itself. It may be on a member driven by the motor. The speed of this member must be 7200 divided by the number of contacts per revolution of the rotating member.

Thereby values of synchronous speed in any fraction of 7200 R. P. M. may be attained. For example, in the above equation C may, by suitable gearing, be made 7.2 and then the synchronous speed becomes exactly 1000 R. P. M.

The contactor 13—14 may be disposed on the shaft 10 inside or outside the motor frame.

The contactor may be a simple mechanical type of contactor, such as shown in Figure 5, where two arms 17, 17 have their rear ends hooked over pins 18, 18 and carry at their forward ends contacts 19, 19, which are held in engagement as by springs means 20, 20 when the interposed cam 22 assumes the position shown in Figure 5, permitting the contacts 19, 19 to engage. By the arrangement shown in Figure 5, two contacts per revolution are produced. By making the cam rectangular, four contacts per revolution may be produced, as will be apparent to those skilled in the art.

In case it is desired to handle larger amounts of current than can readily be handled by the contactor, such as shown in Figure 2 or 5, provision may be made for utilizing the contactor to control the firing of an electronic tube. Thereby the contactor 13, 14 shown in Figure 3 needs to carry only a pilot current for the purpose of firing the tube 25 which may be of the thyratron type, that is, one wherein the conductivity of the tube after it is once established persists to zero voltage in the wave of voltage. In Figure 3, a source of firing potential is shown at 26 connected to the firing electrode or grid 27 to a high resistance 28. The conductors 15, 16 periodically open the short upon a source of potential 26, and impress a firing potential upon the electrode 27, whereby the firing of the tube 25 occurs. Various other arrangements of specific forms of tubes and synchronous contactors may be provided for producing the conductivity for the predetermined interval through the impedance device, in this case, the tube 25. The tube 25 may be considered as an infinite resistance which is broken down to conductivity, instead of the resistance 8 which is short-circuited to produce conductivity. The concept is to produce in the circuit a periodic conductivity at controlled and selected angular positions on the power wave or voltage wave of the impressed alternating current power. The impedance 25 may be connected in parallel with a high resistance which serves to supply the motor with sufficient power to cause it to turn over and start the operation.

In a series motor circuit as shown at Figure 3, the resistance through the impedance is infinite. Hence, complete control of all the power applied to the motor may be had. By using a tube for each half of the wave, the circuit can be fired anywhere from point 1' on curve A to point 3', and continues to supply power during the half cycle until the voltage passes through zero. In such a case, it is not a question of selecting 30 degrees, as was done by way of example in Figure 2, but selecting as much of the 90 degrees of the voltage wave A as is desired, since with the use of a thyratron type of tube the current continues to flow after once firing of the tube has occurred until the instantaneous voltage drops to substantially zero.

In this case as the motor armature tends to lag behind synchronism because of an increase in load the thyratron tube will be fired further ahead of the terminal zero point or tail of the half wave thereby receiving a larger power impulse. On the other hand if the load drops off and the motor armature tends to run ahead of synchronism, the tube will be fired closer to the terminal zero or tail of the half wave and less power will be delivered by the impulse. The motor of Figure 3 may advantageously be provided with starting means such as a manually operable shunt across the impedance 25 or across the contactor switch 13—14 or the shaft of the motor may be spun by hand.

In Figure 4 I have illustrated a motor consisting of a wound stator 30 and a corresponding wound rotor 32, leading through brushes and slip rings, not shown, to a resistance 33. By shorting all or a part of the resistance 33 at a specific angular position of the rotor, the speed of the motor may be brought to and held at a speed which has a fixed relation to the frequency. The speed may be any fraction of true synchronous speed. This may be done by the cam 34 driven from the shaft 10 of the rotor and cooperating pairs of springs 35 and 36 for shorting the corresponding desired portion of the starting resistance 33. The speed of the rotor relative to the controlling or primary frequency is controllable by the number of cam dwells or contact closures per rotation. This in turn may be obtained by control of the number of cam throws on the body of the cam 34 or by inserting a speed change device employing a suitable gear ratio between the rotor 32 and the rotatable cam body 34. Fractional relations may readily be obtained by the gear ratio. In this form of motor and control the cam controlled closures of the wound rotor circuit are coordinated not with the frequency of the primary winding 30, but with the frequency in the secondary or rotor winding 32. The frequency in the rotor winding varies from 60 cycles at standstill to 0 cycles at full synchronous speed, assuming 60 cycles as the primary or exciting frequency. If, for example, the rotor speed is to be 1800 R. P. M., the frequency in the rotor circuit is 30 cycles, and the number of closures of the impedance controlling contacts per revolution of the rotor shaft is two. For any predetermined speed to which the ratio of synchronous speed is not an interger, a suitable gear ratio between the rotor and the contact controlling cam, and a suitable number of dwells on the cam may be employed. Obviously, the frequency of the impressed current may be whatever commercial frequency or other frequency is available for any of the forms of control shown.

In the motor and speed control circuit of my invention assuming 60 cycle primary current, the rotor speed may theoretically be any selected value between 7200 and 0.

The invention has other uses. Since the energy available from a sine wave of power that has been tapped as described above is a function of the point at which or the range over which the tapping takes place, the application of tapped power or voltage to other uses is feasible. For example, a control of voltage is thereby made possible.

Assume that the motor of Figure 2 equipped with a speed controlling impedance and contactor is employed to drive a constant load, and is provided with an auxiliary contactor similar to the contactor shown in Figure 3. Assume it is desired to control the lighting of the lamps 37 which constitute the load, whereby definite illumination may be obtained, and the same may be dimmed by selecting the particular part of the power wave at which firing occurs. The lamps 37 may be series type lamps, or they may be lamps connected in parallel. The control of the power supplied to them and passing through them may be nicely adjusted by selecting that part of the voltage wave on which firing of the tube 25 is effected. Obviously angular adjustment of the firing is intended. The particular significance of this arrangement is that the variations in voltage are automatically taken care of, since the motor in selecting the instantaneous voltage required to maintain its speed constant will maintain a constant potential upon the load where so arranged, or will maintain a constant power input where so desired.

The effective potential to be applied to a load may be secured by selecting the position on the voltage half wave of the 30° employed as in Figure 2, or the applied power may be selected by shifting the point of firing along the voltage curve to determine the point at which firing should occur to secure the desired amount of power as in Figure 3.

For keeping the voltage applied to the load constant the point of the sine wave at which the interception or tapping would take place would be a function of voltage on the motor. Hence, with the constant load, a change in voltage upon the motor and upon the load would require the main contactor 13, 14 to tap the voltage wave at a different point to maintain its correct speed. The auxiliary contactor therefore would also vary the point at which it tapped the voltage wave, with the result that a constant effective voltage would be applied to the lighting load. Thus, by shifting the angular position of the brush 14 about the axis of the rotary contactor, a rather large variation or graduation in voltage supplied to the lamp may be obtained without the use of resistors or transformers. The same principal may find application in a number of similar types of problems. For instance, if constant voltage on a circuit be required, the motor may be connected directly to the line to be regulated. If a variable regulation be desired, the variation may be accomplished by variation of the voltage applied to the motor which would cause a varying voltage to be applied to the load through the control device.

I am aware that it is old to employ a synchronous motor of the type wherein the rotor has variable reactance to drive a commutator to pick off a part of the voltage wave. Such a combination does not compensate for variations of voltage impressed upon the supply line. According to my device relative shift between the arrival of the voltage half wave and the instantaneous closure of the contactor due to voltage drop results in selection of a greater effective part of the half wave. Hence, my device tends to maintain a uniform and constant delivery of power in the work circuit even though the voltage drops.

While I have applied the invention in practice to a specific form of motor, that is, to series motors of the commutator type, such as are employed for small or fractional horse power alternating current or direct current series motors, the invention is applicable to motors of various specific forms, so long as they are of the asynchronous type.

I do not intend therefore to be limited to the specific details shown and described, except as they are recited in the appended claims. The principle, so far as I have been able to determine, is new, and may applied in a wide variety of physical forms.

I claim:

1. In the operation of an asynchronous alternating current electric motor having a stator and a rotor, the method of holding the rotation of the rotor at a speed in predetermined ratio to the frequency of the alternations of the electric current operating the same which comprises periodically and in predetermined relation to the frequency of the alternating current impressing an impulse of alternating current voltage of less than half wave duration upon the motor when the rotor arrives at a predetermined angular position.

2. In the operation of an asynchronous alternating current electric motor having a stator and a rotor, the method of holding the rotation of the rotor in synchronism with the alternations of the electric current operating the same which comprises periodically in synchronism with the alternating current wave impressing an impulse of alternating current voltage of less than half wave duration upon the motor when the rotor arrives at a predetermined angular position, and increasing the mean effective voltage of the impulse as the rotor tends to lag behind said predetermined angular position.

3. In the operation of an asynchronous alternating current electric motor having a stator and a rotor, the method of holding the rotation of the rotor in synchronism with the alternations of the electric current operating the same which comprises periodically in synchronism with the alternating current wave impressing an impulse of alternating current voltage of less than half wave duration upon the motor when the rotor arrives at a predetermined angular position, increasing the mean effective voltage of the impulse as the rotor tends to lag behind said predetermined angular position, and decreasing the mean effective voltage of the impulse as the rotor tends to precede said predetermined angular position.

4. In the operation of an asynchronous series type alternating current motor having a rotor and a stator, the method of moving the rotor in synchronism with the alternating current wave which consists in impressing the voltage of a selected fractional part only of the alternating current wave upon the terminals of the motor synchronously with the arrival of the rotor in a predetermined angular position.

5. In the operation of a series type alternating current motor having a rotor and a stator, the method of moving the rotor in synchronism with the alternating current wave which consists in impressing the voltage of a selected fractional part only of the alternating current wave periodically upon the terminals of the motor synchronously with the arrival of the rotor in a predetermined angular position, and increasing the voltage of the impressed impulses as the rotor lags behind the aforesaid predetermined angular position.

6. In the operation of a series type alternating current motor having a rotor and a stator, the method of moving the rotor in synchronism with the alternating current wave, which consists in impressing upon the terminals of the motor impulses of alternating current voltage of less than half wave duration selected from a predetermined angular electrical position on corresponding waves of voltage of the alternating voltage when the rotor arrives at a corresponding predetermined angular mechanical position.

7. In the operation of a series type alternating current motor having a rotor and a stator in synchronism with the alternating current, the method which consists in impressing the voltage of a selected number of degrees and which are less than 90 degrees of electrical angle of the alternating current wave periodically upon the terminals of the motor synchronously with the arrival of the rotor in a predetermined angular position.

8. In the operation of a series type alternating current motor having a rotor and a stator in synchronism with the alternating current, the method which consists in impressing an alternating voltage upon the terminals of the motor and impressing upon the terminals of the motor additional impulses of higher alternating current voltage of less than half wave duration selected from a predetermined angular electrical position on corresponding voltage waves when the rotor arrives at a corresponding predetermined angular mechanical position.

9. An alternating current motor of the series type comprising a stator and rotor and having external terminals adapted to be connected to an alternating current supply, current limiting means in series relation with said terminals, a circuit controller cooperating with said current limiting means to increase the instantaneous value of current flow through the motor, and means for operating said circuit controller synchronously with the rotation of said rotor.

10. In combination, a series type motor having a rotor, impedance means in series relation with the motor, means including a contactor for altering the effectiveness of said impedance means, and means operating synchronously with the rotor for operating said contactor at a predetermined angular position of the rotor.

11. In combination a series type motor adapted to operate on alternating current and having a rotor, an impedance in series with the motor, a shunt for at least a portion of said impedance, a switch for opening and closing said shunt, and a means moving synchronously with the rotor for closing said switch at a predetermined angular position of said rotor in its rotation.

12. In combination a series type motor having a rotor and being adapted to operate on alternating current, an electron tube having anode and cathode in series relation with said motor, said tube having a control electrode for rendering the tube conductive, a switch operated synchronously with the rotor, and circuit connections controlled by said switch for energizing said control electrode to render the tube conductive.

13. In combination, a wound rotor motor comprising a stator and a wound rotor, impedance means in series relation with the wound rotor, means including a contactor for altering the effectiveness of said impedance means, and means operating in timed relation to the rotor for operating said contactor at a predetermined angular position of the rotor.

14. In combination, a wound rotor motor comprising a stator and a wound rotor, impedance means in series relation with the wound rotor, means including a contactor for altering the effectiveness of said impedance means, a cam for operating said contactor, and motion transmitting means between the rotor and the cam for transmitting rotary motion at a predetermined ratio from the rotor to the cam, whereby said cam operates said contactor when the rotor is at a predetermined angular position relative to the stator.

15. The method of operating an asynchronous alternating current motor having stator and rotor in series relation at a speed which is synchronous with the alternations of impressed voltage which comprises impressing an alternating current voltage upon the terminals of the motor and periodically and in predetermined relation to the frequency of the impressed voltage increasing the impressed alternating current voltage when the rotor arrives at a predetermined angular position in its rotation.

16. Method of operating an asynchronous alternating current motor having rotor and stator in series relation in synchronism with the frequency of the impressed voltage which comprises impressing an alternating current voltage upon said motor and when the rotor arrives in a predetermined angular position increasing the impressed alternating current voltage upon said motor while said rotor advances through a predetermined part of one rotation.

17. Method of operating a series type motor in synchronism with the alternations of an alternating voltage which comprises moving the armature into a predetermined angular position and simultaneously impressing a part only of a half wave of said voltage upon the motor to drive the armature and selectively impressing a more effective part only or a less effective part only of the succeeding alternating voltage half wave depending upon whether the armature lags behind synchronism or runs ahead of synchronism within the succeeding rotational movement of the armature.

EARL L. TORNQUIST.

REFERENCES CITED

The following references are of record in the file of this patent:

UNITED STATES PATENTS

| Number | Name | Date |
|---|---|---|
| 548,127 | Moore | Oct. 15, 1895 |
| 1,410,702 | Meyer | Mar. 28, 1922 |
| 1,420,858 | Meyer | June 27, 1922 |
| 2,223,165 | Currier | Nov. 26, 1940 |
| 2,010,577 | Wilson | Aug. 6, 1935 |
| 1,936,246 | Purlington | June 19, 1934 |
| 1,944,756 | Quarles | Jan. 23, 1934 |
| 374,871 | Hackhauser | Dec. 13, 1887 |
| 552,313 | Brown | Dec. 31, 1895 |
| 1,102,116 | Wood | June 30, 1914 |
| 1,231,661 | Stuart | July 3, 1917 |
| 1,858,271 | Harness et al. | May 17, 1932 |
| 1,438,976 | Wold | Dec. 12, 1922 |

FOREIGN PATENTS

| Number | Country | Date |
|---|---|---|
| 348,086 | Great Britain | 1929 |
| 501,026 | Great Britain | Feb. 20, 1937 |